United States Patent
Linares et al.

(10) Patent No.: US 10,340,670 B2
(45) Date of Patent: Jul. 2, 2019

(54) LOW VOLTAGE ELECTRICAL DISTRIBUTION INSTALLATION

(71) Applicant: Schneider Electric Industries SAS, Rueil Malmaison (FR)

(72) Inventors: Louis Linares, La Terrasse (FR); Avinash Papisetti, Grenoble (FR); Olivier Wasner, Eyben (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/816,273

(22) Filed: Nov. 17, 2017

(65) Prior Publication Data

US 2018/0166865 A1  Jun. 14, 2018

(30) Foreign Application Priority Data

Dec. 14, 2016 (FR) ...................... 16 62402

(51) Int. Cl.
 *H02G 5/06* (2006.01)
 *H02B 1/20* (2006.01)
 (Continued)

(52) U.S. Cl.
 CPC ................. *H02B 1/20* (2013.01); *H02B 1/21* (2013.01); *H02B 1/56* (2013.01); *H02B 13/00* (2013.01); *H02G 5/025* (2013.01)

(58) Field of Classification Search
 CPC . H02G 5/025; H02G 5/00; H02G 5/02; H02B 1/21; H02B 1/20; H02B 1/00;
 (Continued)

(56) References Cited

U.S. PATENT DOCUMENTS

| 4,030,794 A | * | 6/1977 | Rozenboom | ........... H02G 5/025 174/133 B |
| 6,888,066 B1 | * | 5/2005 | Wiant | ...................... H02B 1/21 174/68.2 |

(Continued)

FOREIGN PATENT DOCUMENTS

| EP | 0 360 237 A1 | 3/1990 |
| EP | 2 086 077 A2 | 8/2009 |

(Continued)

OTHER PUBLICATIONS

French Preliminary Search Report dated Aug. 3, 2017 in French Application 16 62402 filed on Dec. 14, 2016 (with English Translation of Categories of Cited Documents).

*Primary Examiner* — Angel R Estrada
(74) *Attorney, Agent, or Firm* — Oblon, McClelland, Maier & Neustadt, L.L.P.

(57) ABSTRACT

A low voltage electrical distribution installation including at least one busbar linked to a power supply bus or to an upstream protection switchgear, and to switchgears of an electrical equipment item, this installation includes, for each of at least two bars, an insulating support configured to house the bar over substantially all of its length, each insulating support including a device for fixing to another insulating support adjacent to the first, each insulating support situated at the end of a group of insulating supports being configured to be fixed to at least one upright belonging to a device housing the switchgears, via at least one crossmember extending substantially at right angles to the longitudinal direction of the corresponding bar, at least one crossmember being fixed to the upright(s), and to the insulating support such that the assembly including the upright(s), the crossmember(s) and the insulating supports housing the bars, forms a rigid assembly.

23 Claims, 9 Drawing Sheets

(51) Int. Cl.
*H02B 13/00* (2006.01)
*H02B 1/56* (2006.01)
*H02B 1/21* (2006.01)
*H02G 5/02* (2006.01)

(58) Field of Classification Search
CPC .......... H02B 1/56; H02B 13/00; H01R 13/53; H01R 25/16
USPC ....... 174/135, 72 B, 71 B, 88 B, 70 B, 99 B, 174/129 B, 133 B, 149 B, 68.2; 361/600, 361/601, 624, 627, 637, 639, 648, 678, 361/611; 439/76.2, 76.1, 949, 535
See application file for complete search history.

(56) References Cited

U.S. PATENT DOCUMENTS

| | | | |
|---|---|---|---|
| 6,934,147 B2* | 8/2005 | Miller ...................... | H02B 1/21 |
| | | | 174/68.2 |
| 8,147,257 B2* | 4/2012 | Bury ....................... | H02G 5/025 |
| | | | 439/110 |
| 8,379,374 B2* | 2/2013 | Keegan ................ | H01R 25/142 |
| | | | 174/68.2 |
| 8,829,346 B2* | 9/2014 | Robinson ............... | H02B 1/056 |
| | | | 174/129 B |
| 9,419,423 B2* | 8/2016 | Benedetti ................. | H02G 5/02 |
| 2009/0194652 A1 | 8/2009 | Bury et al. | |

FOREIGN PATENT DOCUMENTS

| | | |
|---|---|---|
| EP | 2 164 136 A2 | 3/2010 |
| FR | 2 598 562 A1 | 11/1987 |
| WO | 2014/064617 A2 | 5/2014 |

\* cited by examiner

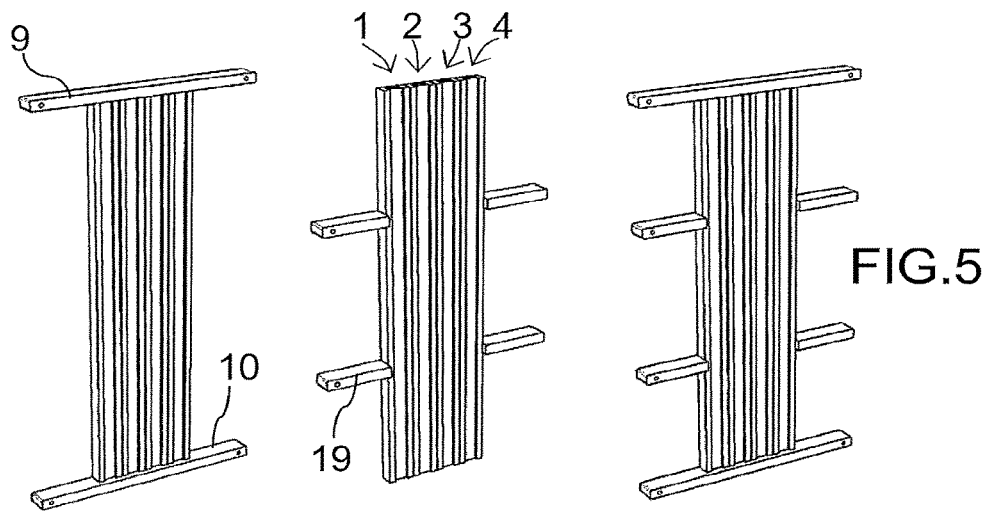
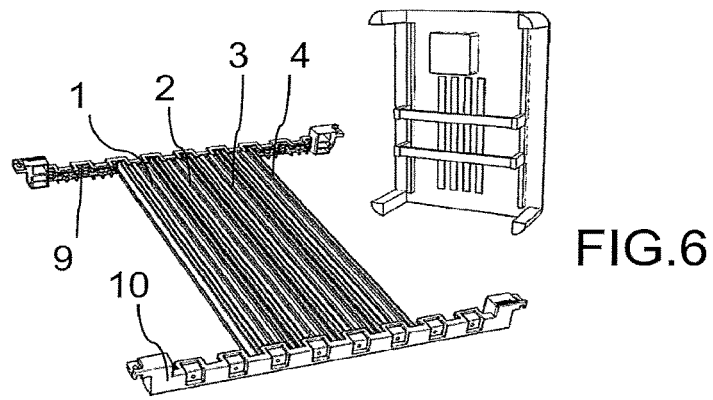
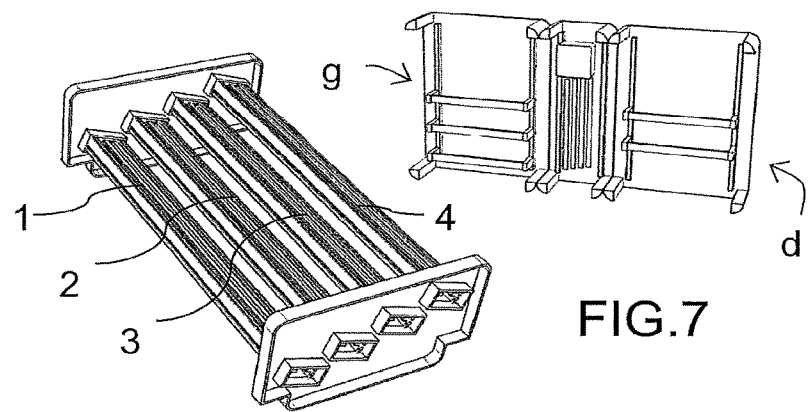
FIG.5
FIG.6
FIG.7

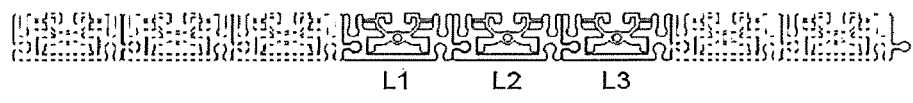
Fig.20a
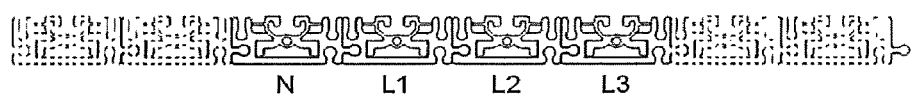
Fig.20b
Fig.20c
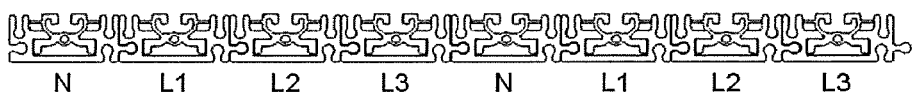
Fig.20d
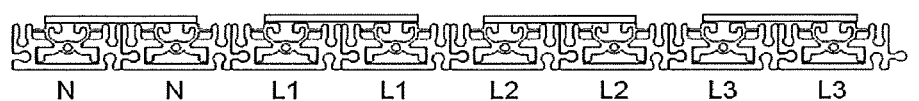
Fig.20e
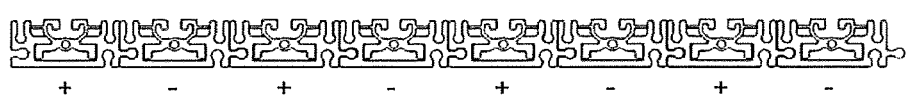
Fig.20f
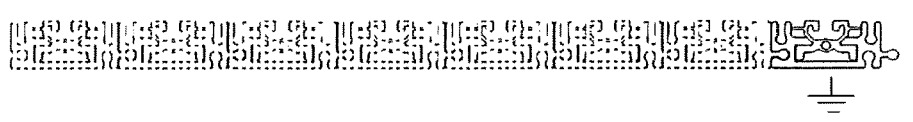
Fig.20g
FIG.20

LOW VOLTAGE ELECTRICAL DISTRIBUTION INSTALLATION

TECHNICAL FIELD

The present invention relates to the field of functional electrical switchboards that make it possible to ensure the electrical distribution of power to switchgears or functional units.

The present invention relates more particularly to a low voltage electrical distribution installation comprising at least one busbar linked electrically on the one hand to a power supply busbar or to an upstream protection switchgear, and on the other hand to switchgears of an electrical equipment item.

PRIOR ART

Generally, the electrical distribution in low voltage electrical switchboards is produced using bare copper busbars with no particular protection, which necessitates the installation of a protection shield. The busbars are held in the cabinets using several insulating supports. The number of supports necessary is defined as a function of the level of electrodynamic withstand strength of the busbar and of the short-term rated current to be observed in the electrical installation considered, and the set of these supports restricts accessibility for performing connections onto the busbar. These busbar supports are therefore a hindrance to wiring and interfere with the distribution of the current.

These supports are designed to observe the current level, the distances in air, the tracking currents, a certain level of heat dissipation according to the standard, and the necessary electrodynamic withstand strength to the short-circuit current of the installation.

Often, these supports take the form of insulating crossmembers consisting of two parts screwed together, these crossmembers being at right angles to the busbar and comprising notches intended to house a part of the bars and making it possible to immobilize the bars at the desired distance.

The document FR2598562 is known that describes a busbar of an electrical energy distribution switchboard, held by two uprights of insulating material. The ends of the bars are embedded in housings of conjugate form, formed in the uprights, so as to constitute a rigid grating serving as support frame. In this document, the supports hold the conductive bars and prevent accessibility for connecting switchgears at all points of the conductive bar thus making the connection of the functional units complex. The supports do not provide any protection for the conductive bars saving by the addition of a simple protective shield. It does not incorporate any direct protection of the active parts or a protection against the electrical arcs between the different phases. The solution described above requires the association of several components making it possible to construct a rigid grating serving as conductive bar support.

Also known is the document EP0360237 describing a low voltage electrical distribution installation comprising vertical conductors linked electrically on the one hand to a power supply busbar, and on the other hand to electrical equipment switchgears. Each vertical conductor is a structural member having an H-shaped section, comprising a first and a second parallel branch joined by a transverse branch, the ends of said parallel branch being provided with protuberances facing one another in pairs. The conductors are insulated from one another and from the rest of the installation by sheaths. All these conductors are aligned in one and the same vertical plane. The electrical connection technique requires the use of a specific flange adding an additional element to the connection generating risks of overheating. The above patent solution generates a non-flush connection well that does not allow the easy use of market-standard terminals. This solution does not offer the compactness necessary to the installations and the proposed insulation provides only a low short-circuit current withstand strength.

The present invention resolves these problems and proposes a busbar, with no intermediate support, that is insulated, compact, modular, adaptable, robust, and which can be equipped with accessories.

SUMMARY OF THE INVENTION

To this end, the subject of the present invention is a low voltage electrical distribution installation of the kind previously mentioned, this installation being characterized in that it comprises, for each of at least two bars, an insulating support intended to house said bar over substantially all of its length, each insulating support comprising means for fixing to another insulating support adjacent to the first, the number of insulating supports being able to be adapted to demand, each insulating support situated at the end of a group of insulating supports, being intended to be fixed to at least one upright belonging to a device housing the switchgears, via at least one crossmember extending substantially at right angles to the longitudinal direction of said corresponding bar, said at least one crossmember being fixed on the one hand to the upright(s), and on the other hand to said insulating support in a way that makes it possible to offer total accessibility to the connection surface of the bar and such that the assembly comprising the upright(s), the crossmember(s) and the insulating supports housing the bars forms a rigid assembly.

It will be noted that the complete system can be fixed horizontally or vertically.

According to a particular embodiment, this installation comprises two crossmembers, respectively called top and bottom, intended to be fixed over their length, to the ends of the bars and of their respective insulating supports, and by their two opposite ends respectively to two uprights belonging to the abovementioned housing device.

According to another embodiment, this installation comprises at least one assembly of two intermediate crossmembers, or fixing lugs, fixed respectively by one of their ends to the two insulating supports situated respectively at the two ends, of a group of insulating supports, and by their opposite end, respectively, to two uprights belonging to the abovementioned housing device.

According to a particular feature, the abovementioned fixing means comprise a clip or a runner provided on an insulating support cooperating respectively with a runner or a clip provided on an insulating support adjacent to the first, said clips and runners being designed to hold the bars relative to one another, and to obtain the level of electrodynamic withstand strength required by the installation.

According to another feature, the means for fixing the insulating supports to the intermediate crossmembers comprise a clip or a runner provided on the insulating support cooperating respectively with a runner or a clip provided on the intermediate crossmember.

According to another feature, the clip or the runner, provided on the insulating support, extends substantially over all the length of said insulating support.

According to another feature, the or each insulating support comprises a structural member having a substantially U-shaped cross section, said structural member comprising a base intended to receive the corresponding bar positioned flat, and two flanks extending substantially at right angles to said bar.

According to another feature, the abovementioned flanks comprise the abovementioned fixing means.

According to another feature, one of the flanks comprises a clip whereas the other of the flanks comprises a runner.

According a particular embodiment, the bars and their associated insulating supports are positioned flat substantially in one and the same plane.

According to another embodiment of the invention, the crossmembers comprise means for fixing the position of the bars relative to one another according to a staged mode.

According to another feature, this installation comprises at least one insulating support housing an insulating plug so as to define two different conductive bar portions in the same insulating support.

According to another feature, the or each crossmember comprises, at the connection to a bar, a marking zone capable of specifying the current distribution value.

According to a particular embodiment, this installation comprises a so-called square busbar comprising two assemblies of two insulating supports fixed to one another by one of their lateral faces or flanks, these two assemblies being positioned back-to-back so as to form a square.

According to a particular embodiment, this installation comprises a first and a second assembly, the two supports of one of the assemblies being positioned back-to-back, these two assemblies being oriented in the same way but the two supports of the second assembly being separated from one another by a distance corresponding substantially to the height of the two joined supports of the first assembly.

According to another embodiment, at least four of the insulating supports comprise, on one of their flanks, both a clip and a runner, said clip and runner extending in a direction substantially at right angles to one another, and these four supports are fixed to one another so as to form a cross.

According to another feature, this installation comprises at least one spacer in accessory form, said spacer extending substantially over the same length as the bars, being capable of being placed against two adjacent insulating supports and of being fixed to the two insulating supports by means of the same fixing means as if it were an insulating support.

According to another feature, the insulating material of which the or each insulating support is composed is designed to promote the heat dissipation linked to the flow of current.

According to another feature, the insulating supports are pressed against a wall of a metal enclosure promoting the heat exchange to the outside of the enclosure.

According to another feature, this installation comprises at least one energy-dissipating heat sink placed inside an insulating support, at one the ends of a bar.

According to another feature, this installation comprises means for fixing to a divisible cover and/or to one or more cable management accessories.

According to another feature, this installation comprises at least one insulating support housing a system making it possible to manage communication inside the abovementioned housing device or else a cable.

According to another feature, this installation comprises eight insulating support positions capable of each receiving an insulating support intended to house a bar, a cable or an accessory, said bar being intended to convey either a phase, or the neutral, or the earth, so as to allow the production of a single-pole or two-pole or three-pole or four-pole installation, said bars and their associated support being capable of being positioned on the left, at the centre, on the right or distributed over the width of the position, said installation being able to comprise a double-neutral or a double-distribution or a doubling of the capacity of the busbar or a mixing of the current typology.

However, other advantages and features of the invention will become more apparent from the following detailed description referring to the attached drawings given purely by way of example and in which:

FIG. 1 is a perspective view illustrating a particular embodiment of an installation according to the invention, FIG. 2 is a perspective view illustrating the difference between an embodiment according to the known prior art and an embodiment according to the invention, FIG. 3 is a view in cross section of the busbar of the preceding figures, FIG. 4 is a perspective view illustrating the bars of the preceding busbar in their support, FIG. 5 is a perspective view illustrating another embodiment of the installation according to the invention, FIGS. 6 and 7 are two perspective views illustrating, respectively, two embodiments of the installation according to the invention, and their implementation in an electrical cabinet, FIGS. 8, 9 and 10 are three cross-sectional views respectively illustrating three different forms of bar that can be received in the insulating support according to the invention, FIG. 11 is a perspective view intended to show the possibility of placing a plug in an insulating support according to the invention, FIG. 12 is a partial perspective view, illustrating an end of the installation according to the invention comprising a marking zone intended to specify the current distribution, FIG. 13, and in particular FIGS. 13a to 13d, illustrate, in cross section, four particular arrangements of the bars and of their associated insulating support, in an installation according to a particular embodiment of the invention, FIGS. 14, 15 and 16 are views in cross section, respectively illustrating the possibility of placing a spacer between two insulating supports for FIG. 14, the reduction of the space necessary between two bars by virtue of the invention with respect to FIG. 15, and the positioning of an installation according to the invention in a metal enclosure for FIG. 16, FIG. 17 is a partial perspective view, illustrating the positioning of a heat sink at the end of a bar in an insulating support, FIG. 18 is a partial perspective view, illustrating the possibility of fixing a cover on the insulating support, FIG. 19 is a part cutaway and part perspective view, illustrating the possibility of incorporating wiring or communication accessories in the installation, and FIG. 20, and in particular FIGS. 20a to 20g, illustrate, in cross-sectional views, different types of electrical distribution that can be produced by virtue of the installation according to the invention.

As illustrated in FIG. 1, the installation I according to a particular embodiment of the invention is composed of several bars 1, 2, 3, 4 intended to be aligned in one and the same plane, each of the bars being housed in an insulating support 5, 6, 7, 8, and two end crossmembers 9, 10 extending at right angles to the bars, said crossmembers being produced in an insulating material, these crossmembers being intended to be fixed over their length to one of the ends of the bars and to their supports by any appropriate means, and being intended to be fixed by their two opposite ends respectively to two uprights 11, 12 belonging to a device housing an electrical equipment item such as an electrical enclosure or cabinet.

As illustrated in FIGS. 2, 3 and 4, the insulating support of each of the conductive bars has a V-shaped cross section and is designed to hold the bars in their housing whatever the current value. This insulating support has, on its lateral faces 13, 14, respectively a clip 15 and a runner 16 over all the length thereof. This clip 15 and this runner 16 make it possible, when several supports are assembled, to hold the bars together, and to obtain the necessary electrodynamic withstand strength at the level required for the installation.

As illustrated in FIG. 2 showing an installation S according to the prior art and an installation I according to the invention, this system of clip and runner over all the length makes it possible to avoid the repetition of the transverse supports t several times over all the length of the bars, as is the case for the busbars of the prior art, which makes it possible to obtain total accessibility to the connection surface on the bar.

Advantageously, each support consists of a piece of U-shaped cross section, comprising a bottom wall intended to receive, flat, a bar and two sidewalls or flanks comprising the abovementioned fixing means.

As illustrated in FIG. 5, only one top crossmember 9 and one bottom crossmember 10 are necessary to fix the busbar in the enclosure.

However, according to another embodiment of the invention, these top 9 and bottom 10 crossmembers can be replaced by lateral fixing lugs 19 that are fixed by a clip or a runner to the supports, these clips and runners cooperating respectively with a runner or a clip provided in a lateral wall of the insulating supports of the bars. In the case of a long busbar length, such fixing lugs can be used in order to reinforce the electrodynamic withstand strength of the assembly.

The bars 1, 2, 3, 4 can be arranged in different ways, for example flat, as illustrated in FIG. 6, or else staged as described in FIG. 7, in order to make it possible to easily produce a distribution to the left side g or to the right side d of the busbar.

The insulating support is conformed so as to be able to receive bars of different sections, 1a, 1b, 1c, 1d, 1e, 1f, 1g, 1h, as illustrated respectively in FIGS. 8, 9 and 10, as well as different types of bars 1i, 1j, 1k, 1l, such as a copper bar, an aluminium bar, a coated aluminium bar or similar.

As illustrated in FIG. 11, an insulating plug 20 can be introduced into an insulating bar support 5, so as to define two different conductive bars 1, 1' in order to address different electrical distribution cases such as, for example, an incomer and an outgoer with a protection in between, the source reversing switches, etc.

As illustrated in FIG. 12, according to a particular embodiment of the invention, one of the crossmembers 9, 10 comprises one or more marking zones 21 in order to specify values of the characteristics of the current distribution.

In FIG. 13, it can be seen that these supports 5, 6, 7, 8 can be associated in different ways in order to form, for example, a flat or square busbar or other types of associations of the bars, depending on the type of installation in which they are likely to be positioned. Thus, it can be seen that, in FIG. 13a, the busbar according to the invention consists for example of two assemblies e, f of bars positioned back-to-back, each assembly consisting of two bars 1, 2 and 3, 4 and their respective laterally-associated supports 5, 6 and 7, 8, the two assemblies e, f extending parallel to one another, this assembly being positioned horizontally.

In FIG. 13b, a same assembly is positioned vertically.

As illustrated in FIG. 13c, the busbar comprising a first assembly g of two bars 1, 2 and their respective supports 5, 6 positioned back-to-back, as well as a second assembly h comprising two other bars 3, 4 positioned respectively on either side of the abovementioned assembly g and below. In FIG. 13d, this busbar consists of four bars, 1, 2, 3, 4 in their support 5 to 8 positioned in star configuration.

In order to allow the associations illustrated in FIGS. 13a and 13b, each insulating support comprises, on either side of the bar positioned flat, or of the base 22 of the abovementioned U, means for fixing to another support, this allowing for a positioning of the bars alongside one another, parallel to one another.

This fixing in this position is produced via facing longitudinal flanks 23, 24 belonging respectively to two supports positioned side-by-side, these flanks comprising the abovementioned clips and runners.

According to this particular embodiment, these clips have a cross section comprising a semi-circular part linked to the main part of the insulating support by a rectangular portion.

In order to allow the production of an association of bars according to FIG. 13d, each insulating support 5 to 8 comprises, at one of its ends, both a clip and a runner, these two elements extending in two directions substantially at right angles to one another.

As illustrated in FIG. 14, spacers 25 in accessory form can be used between two insulating supports and use the lateral clips 15 or runners 16 of the insulating supports 5 to 8 for their fixing, so as to produce different centre-to-centre distances for positioning of the bars between them in order to allow the use thereof according to different standards.

As illustrated in FIG. 15, the insulation obtained by virtue of the insulating support 5 to 8 of each of the bars 1 to 4 makes it possible to avoid excessive distances in air and therefore makes it possible to improve the compactness of the solution.

As illustrated in FIG. 16, the flat association of the insulating supports 5 to 8 makes it possible to retain a bulk that is limited to the minimum because of the complete insulation of the bars.

The busbar supports are traditionally positioned transversely to the conductive bars and are defined to leave a distance in air and a distance for the tracking currents that are sufficient between the bare conductive bars themselves and relative to the outside environment. The complete insulation of the conductive bars and the incorporation of the fixing of the insulating supports between them makes it possible to reduce to a minimum the distances in air and the tracking currents making it possible to obtain a compact solution eliminating the risks of electrical arcing.

This insulation, of which the supports are composed, can be placed in contact with metal parts 26 of an enclosure E. Since this insulating material is designed to promote the thermal dissipation linked to the flow of current, it facilitates the heat exchanges and these supports, once pressed against this metal enclosure wall 26 or similar, promoting the heat exchange outward from the enclosure E.

As illustrated in FIG. 17, dissipating heat sinks 27 can be placed inside the insulating supports 5 to 8, at one end, or even at both ends, of each bar 1 to 4.

It will be noted that, according to a particular embodiment, a chimney system can be associated with the bars, so as to allow the circulation of flows of air in order to optimize the cooling of the conductors. These same chimneys can be associated with air release or arrival zones upon installation in an enclosure. These chimneys allows the circulation from bottom to top of the air over all the length of the bar to assist in the natural or forced circulation of the ambient air. It will be noted that particular forms can be defined on the conductor or on the insulating supports in order to promote the circulation.

It will be noted that, according to a particular embodiment, illustrated in FIG. 18, the insulating support 5 is designed to be equipped with a divisible cover 28 that makes it possible to make the conductive bar assembly completely protected from electrical contacts and allow passage only for the connections necessary to the operation of the installation. To this end, this insulating support comprises snap-fitting means 29 for the cover 28.

As illustrated in FIG. 19, one or more supports 5 are used without conductive bar inside in order to be able to instead install therein systems 30 that make it possible to manage communication inside the switchboards or even to manage cables vertically bearing in mind that the insulating support can also be equipped with a shield 32 to safeguard from disturbances linked to electromagnetic compatibility. The snap-fitting zone of the cover serves also to wedge management accessories of bracelet type 33 or similar.

As illustrated in FIG. 20, the installation produced according to the invention is designed to be able to receive several bar positions m making it possible to make a single-pole, two-pole, three-pole or four-pole distribution, bearing in mind that each of the solutions can be mixed according to the configurations and any type of electrical scheme.

Thus, FIG. 20a illustrates the fact that the installation can be of the single-pole, two-pole, three-pole or four-pole type.

FIG. 20b illustrates the fact that the installation can be placed on the left, at the centre, on the right or distributed relative to the transverse support.

FIG. 20c illustrates an installation comprising a double neutral.

FIG. 20d illustrates a double distribution for the source reversing switches.

FIG. 20e illustrates an installation of bars associated in twos for each type of phase, this making it possible to double the capacity of the busbar in one and the same footprint.

FIG. 20f illustrates an installation in which there is a mixing of current typology, said installation comprising a four-pole AC busbar with a two-pole DC busbar.

FIG. 20g illustrates an installation according to the invention, comprising only one earthing bar.

Figure 1:
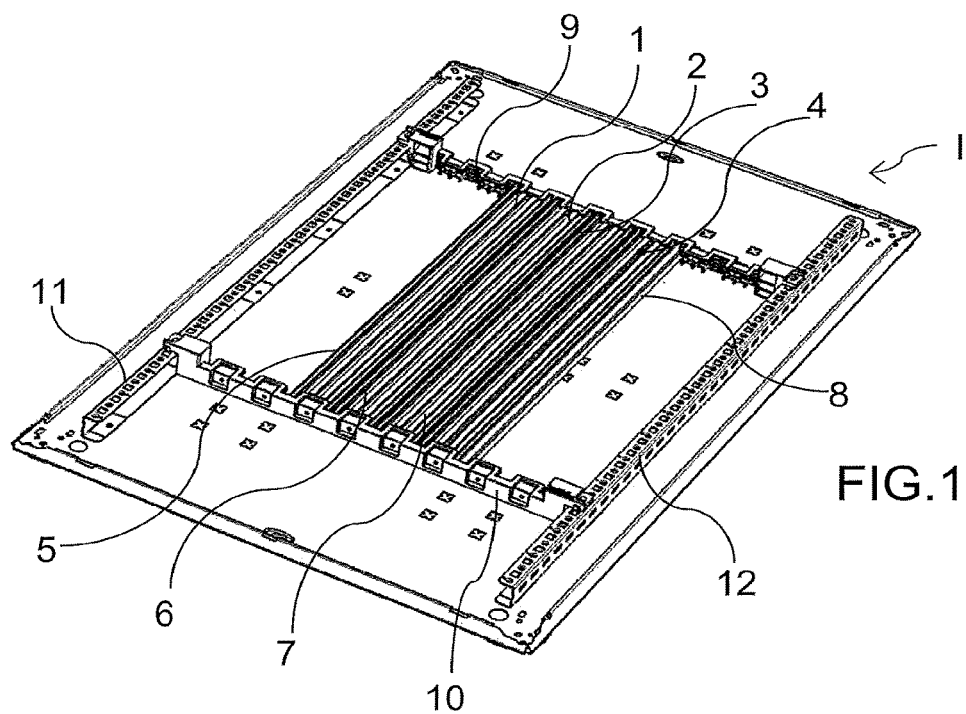
Figure 2:
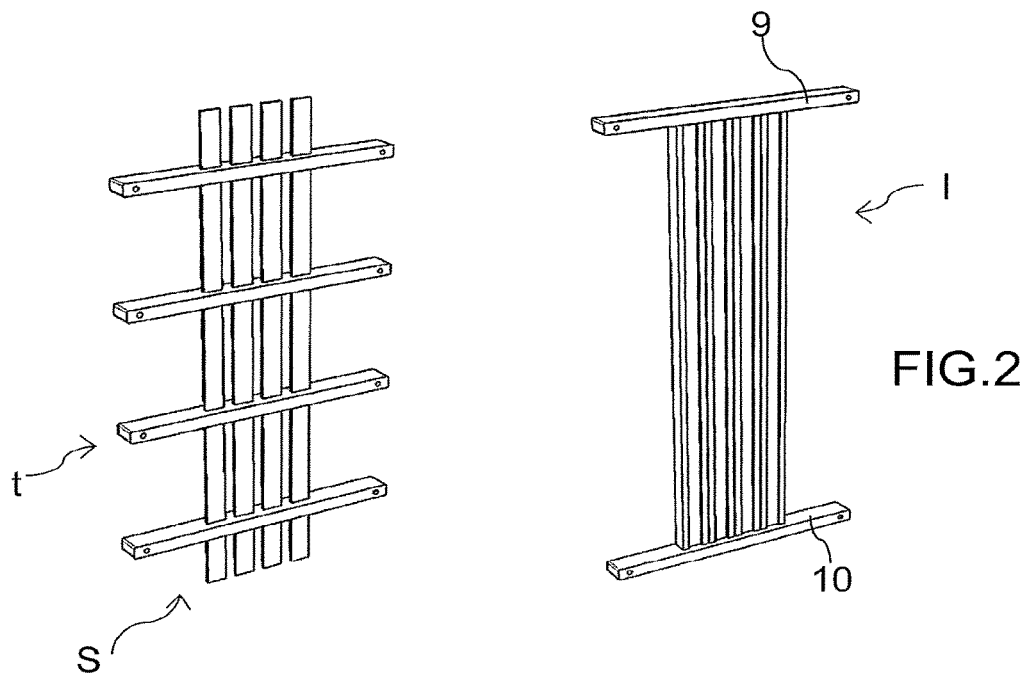
Figure 3:
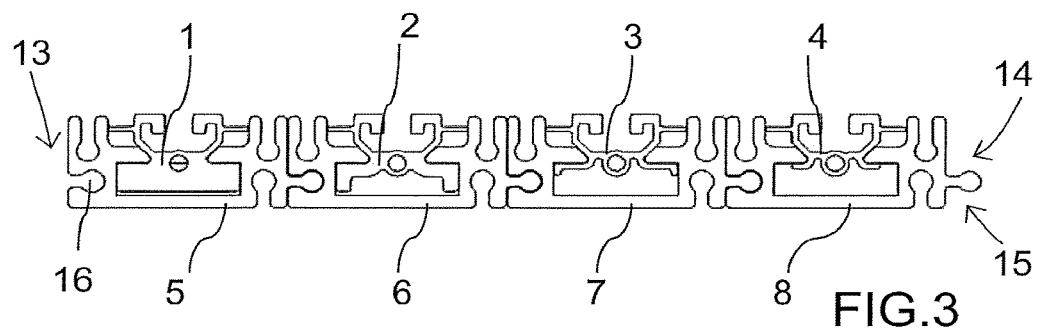
Figure 4:
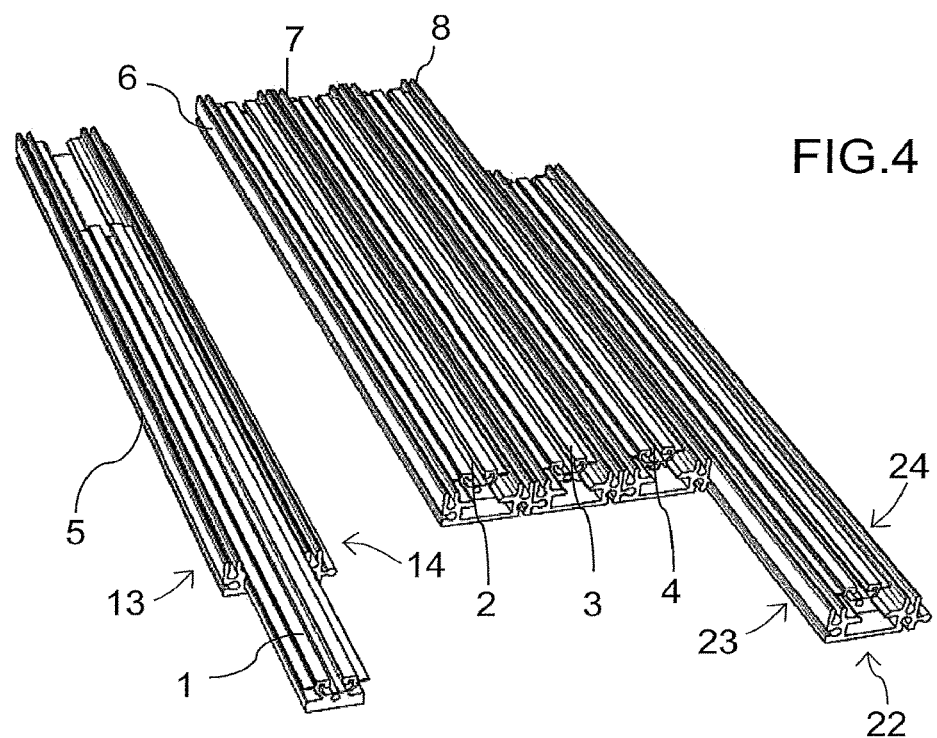
Figure 8:
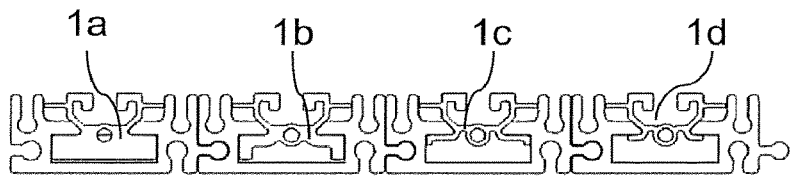
Figure 9:
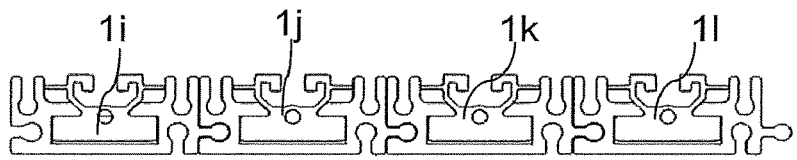
Figure 10:
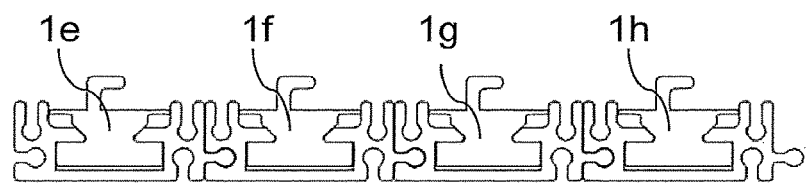
Figure 11:
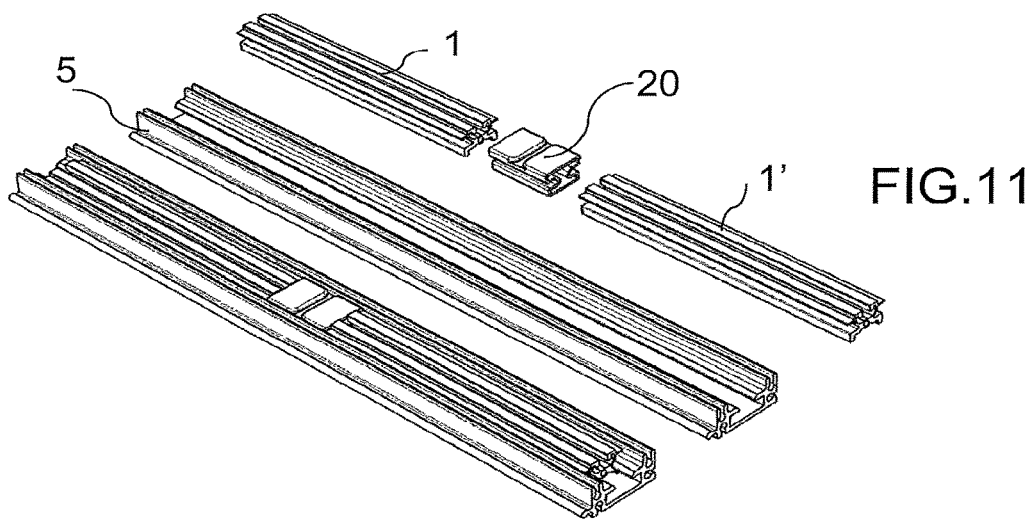
Figure 12:
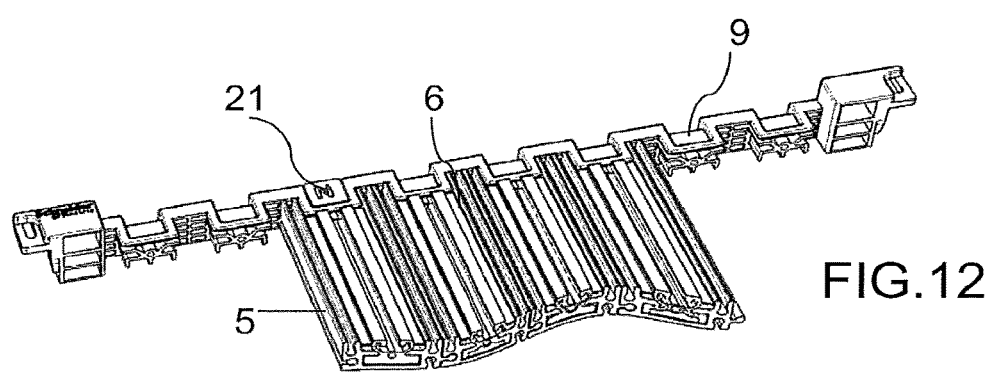
Figure 13:
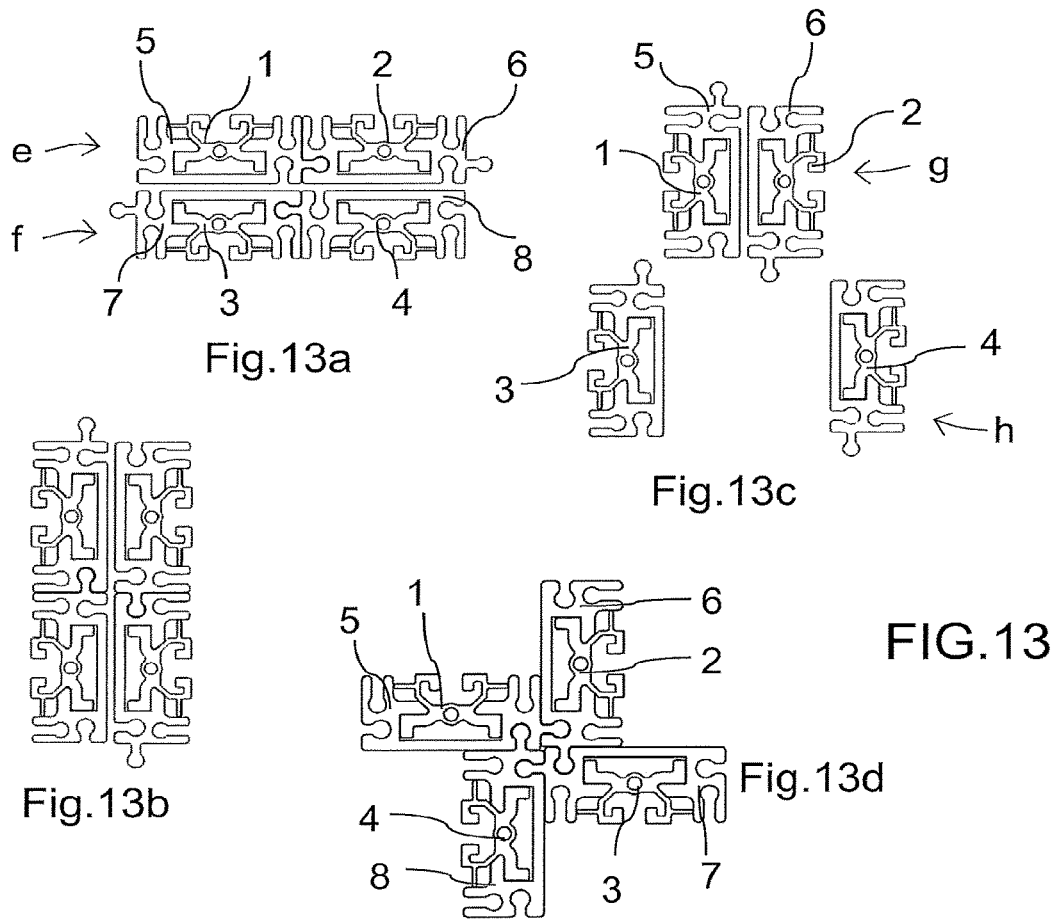
Figure 14:
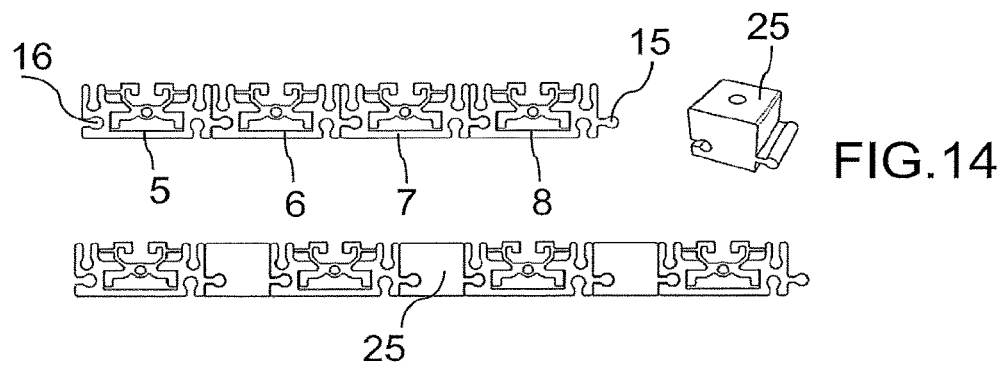
Figure 15:
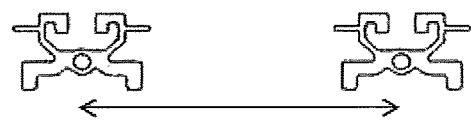
Figure 16:
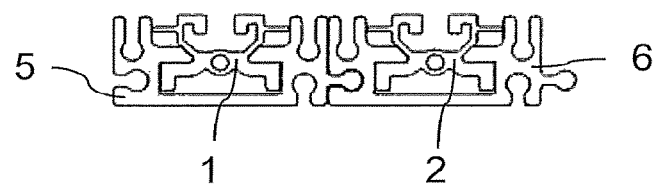
Figure 17:
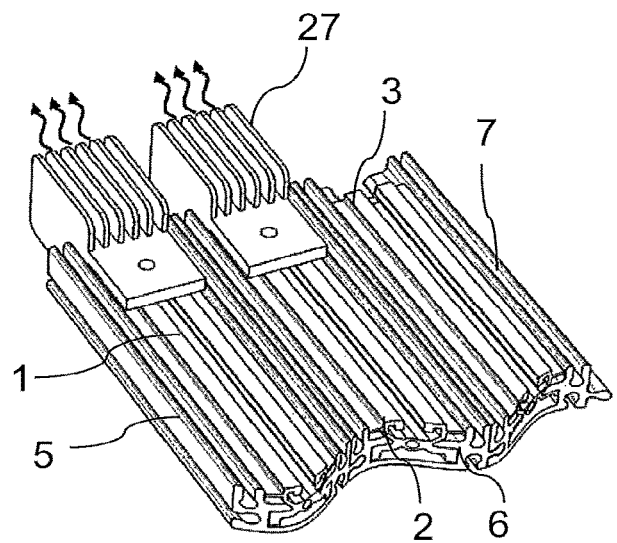
Figure 18:
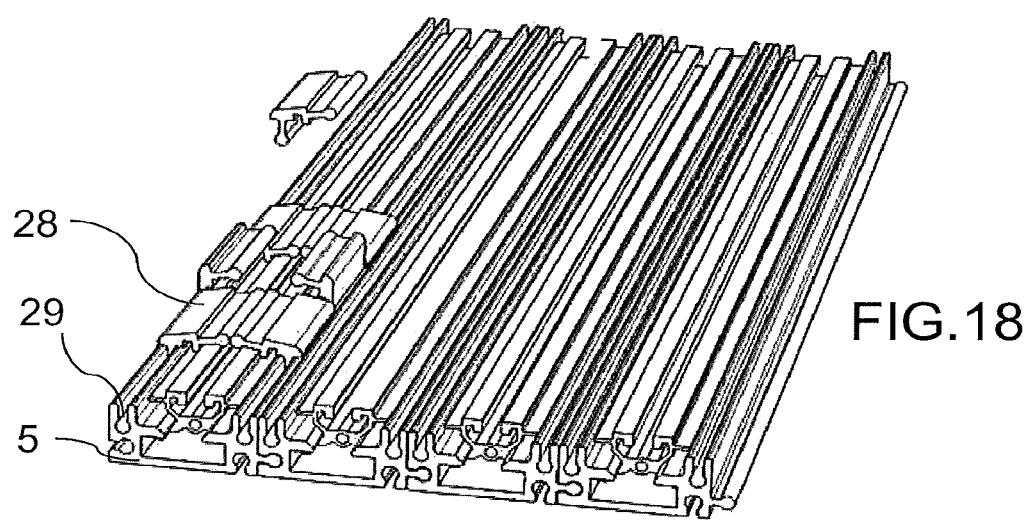
Figure 19:
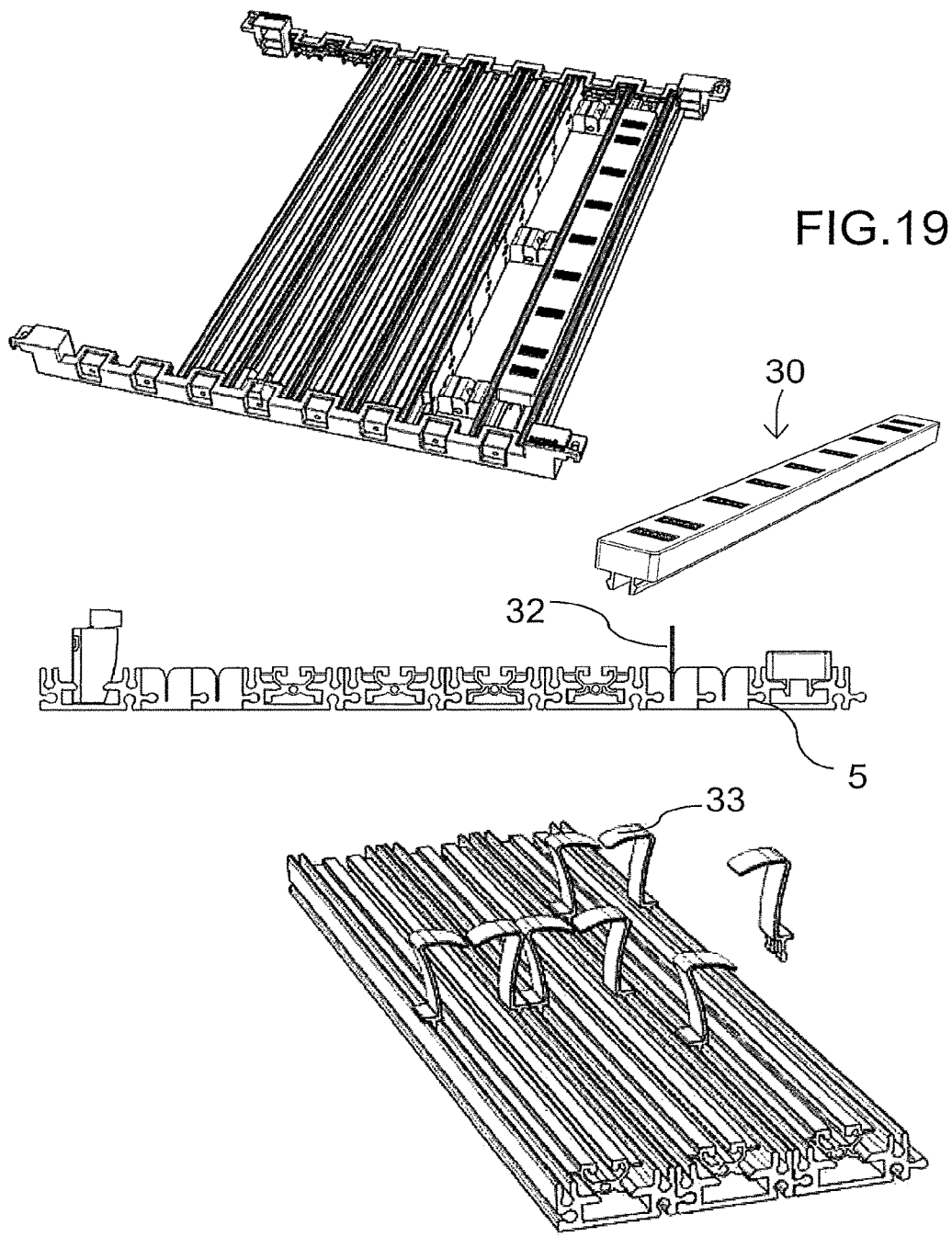

It will be noted that marking zones can also be provided on the profile of the support.

There has therefore been produced, according to the invention, a low voltage electrical distribution installation without intermediate support, insulated, compact and modular, particularly adaptable, robust and which can be equipped with accessories.

Obviously, the invention is not limited to the embodiments described and illustrated which have been given only by way of example.

Thus, other types of fixing means can be used in place of the clips and runners, such as, for example, fixing screws, metal or plastic straps stapling the supports together.

On the contrary, the invention comprises all the technical equivalents of the means described as well as their combinations provided the latter are produced according to its spirit.

The invention claimed is:

1. A low voltage electrical distribution installation comprising:

at least one busbar linked electrically to a power supply busbar, or to an upstream protection switchgear, and to switchgears of an electrical equipment item, wherein, for each of at least two bars, an insulating support configured to house said bar over substantially all of its length, each insulating support comprising a clip and a runner being configured to fix the respective insulating support to another adjacent insulating support, the number of insulating supports being able to be adapted to demand, each insulating support situated at the end of a group of insulating supports, being configured to be fixed to at least one upright belonging to a device housing the switchgear, via at least one crossmember extending substantially at right angles to the longitudinal direction of said corresponding bar, said at least one crossmember being fixed to the upright(s), and to said insulating support so as to offer total accessibility to the connection surface of the bar and such that the assembly comprising the upright(s), the crossmember(s) and the insulating supports housing the bars, forms a rigid assembly, wherein said clip provided on each insulating support is integrated with the insulating support and configured to cooperate with a runner on an adjacent insulating support, and said runner provided on each insulating support is configured to cooperate with a clip on an adjacent insulating support.

2. The installation according to claim 1, comprising two crossmembers, respectively called top and bottom, configured to be fixed over their length, to the ends of the bars and of their respective insulating supports, and by their two opposite ends respectively to two uprights belonging to the abovementioned housing device.

3. The installation according to claim 1, comprising at least one assembly of two intermediate crossmembers, or fixing lugs, fixed respectively by one of their ends, to the two insulating supports situated respectively at the two ends of a group of insulating supports, and by their opposite end respectively, to two uprights belonging to the abovementioned housing device.

4. The installation according to claim 3, comprising said clips and runners are configured to fix the insulating supports to the intermediate crossmembers by cooperating respectively with a runner or a clip provided on the intermediate crossmember.

5. The installation according to claim 1, wherein said clips and runners being designed to hold the bars relative to one another, and to obtain the level of electrodynamic withstand strength required by the installation.

6. The installation according to claim 5, wherein the clip or the runner, provided on the insulating support, extends substantially over all the length of said insulating support.

7. The installation according to claim 1, wherein each insulating support comprises a structural member having a substantially U shaped cross section, said structural member comprising a base configured to receive the corresponding bar positioned flat, and two flanks extending substantially at right angles to said bar.

8. The installation according to claim 7, wherein flanks comprise clips and runners.

9. The installation according to claim 8, wherein one of the flanks comprises a clip while the other of the flanks comprises a runner.

10. The installation according to claim 1, wherein crossmembers comprise means for fixing the position of the bars relative to one another according to a staged mode.

11. The installation according to claim 1, comprising at least one insulating support housing an insulating plug so as to define two different conductive bar portions.

12. The installation according to claim 1, wherein the crossmember comprises, at the connection to a bar, a marking zone capable of specifying the current distribution value.

13. The installation according to claim 1, comprising at least one spacer in accessory form extending substantially over a same length as the bars, capable of being placed between two adjacent insulating supports and of being fixed to said two insulating supports with the same clip and runner as if it were an insulating support.

14. The installation according to claim 1, wherein each insulating support is produced in an insulating material exhibiting the property of promoting the heat dissipation linked to the flow of the current.

15. The installation according to claim 1, comprising at least one energy dissipating heat sink placed inside an insulating support, at one of the ends of a bar.

16. The installation according to claim 1, wherein each insulating support comprises a clip and a runner to a divisible cover and/or to one or more cable management accessories.

17. The installation according to claim 1, comprising at least one insulating support housing a system so as to manage communication inside the housing device or else a cable.

18. The installation according to claim 1, comprising eight insulating support positions capable of each receiving an insulating support configured to house a bar, a cable or an accessory, said bar being configured to convey either a phase, or the neutral, or the earth, so as to allow the production of a single pole or two pole or three pole or four pole installation, said bars and their associated support being capable of being arranged on the left, at the centre, on the right or distributed over the width of the position, said installation being able to comprise a double neutral or a double distribution or a doubling of the capacity of the busbar or a mixing of the current typology.

19. A low voltage electrical distribution installation comprising:
at least one busbar linked electrically to a power supply busbar, or to an upstream protection switchgear, and to switchgears of an electrical equipment item,
wherein, for each of at least two bars, an insulating support configured to house said bar over substantially all of its length, each insulating support comprising means for fixing to another insulating support adjacent to the first, the number of insulating supports being able to be adapted to demand, each insulating support situated at the end of a group of insulating supports, being configured to be fixed to at least one upright belonging to a device housing the switchgear, via at least one crossmember extending substantially at right angles to the longitudinal direction of said corresponding bar, said at least one crossmember being fixed to the upright(s), and to said insulating support so as to offer total accessibility to the connection surface of the bar and such that the assembly comprising the upright(s), the crossmember(s) and the insulating supports housing the bars, forms a rigid assembly, and
wherein the bars and their associated insulating supports are positioned flat substantially in one and the same plane.

20. The installation according to claim 19, wherein the insulating supports are pressed against a wall of a metal enclosure promoting the heat exchange to the outside of the enclosure.

21. A low voltage electrical distribution installation comprising:
at least one busbar linked electrically to a power supply busbar, or to an upstream protection switchgear, and to switchgears of an electrical equipment item,
wherein, for each of at least two bars, an insulating support configured to house said bar over substantially all of its length, each insulating support comprising means for fixing to another insulating support adjacent to the first, the number of insulating supports being able to be adapted to demand, each insulating support situated at the end of a group of insulating supports, being configured to be fixed to at least one upright belonging to a device housing the switchgear, via at least one crossmember extending substantially at right angles to the longitudinal direction of said corresponding bar, said at least one crossmember being fixed to the upright(s), and to said insulating support so as to offer total accessibility to the connection surface of the bar and such that the assembly comprising the upright(s), the crossmember(s) and the insulating supports housing the bars, forms a rigid assembly, and
wherein a square busbar comprising two assemblies of two insulating supports fixed to one another by one of their lateral faces or flanks, said two assemblies being positioned back to back so as to form a square.

22. A low voltage electrical distribution installation comprising:
at least one busbar linked electrically to a power supply busbar, or to an upstream protection switchgear, and to switchgears of an electrical equipment item,
wherein, for each of at least two bars, an insulating support configured to house said bar over substantially all of its length, each insulating support comprising means for fixing to another insulating support adjacent to the first, the number of insulating supports being able to be adapted to demand, each insulating support situated at the end of a group of insulating supports, being configured to be fixed to at least one upright belonging to a device housing the switchgear, via at least one crossmember extending substantially at right angles to the longitudinal direction of said corresponding bar, said at least one crossmember being fixed to the upright(s), and to said insulating support so as to offer total accessibility to the connection surface of the bar and such that the assembly comprising the upright(s), the crossmember(s) and the insulating supports housing the bars, forms a rigid assembly, and
the installation further comprising a first and a second assembly, the two supports of one of the assemblies being positioned back to back, said two assemblies being oriented in the same way but the two supports of the second assembly being separated from one another by a distance corresponding substantially to the height of the two joined supports of the first assembly.

23. A low voltage electrical distribution installation comprising:
at least one busbar linked electrically to a power supply busbar, or to an upstream protection switchgear, and to switchgears of an electrical equipment item,
wherein, for each of at least two bars, an insulating support configured to house said bar over substantially all of its length, each insulating support comprising means for fixing to another insulating support adjacent to the first, the number of insulating supports being able to be adapted to demand, each insulating support situated at the end of a group of insulating supports, being configured to be fixed to at least one upright belonging to a device housing the switchgear, via at least one crossmember extending substantially at right angles to the longitudinal direction of said corresponding bar, said at least one crossmember being fixed to the upright(s), and to said insulating support so as to offer total accessibility to the connection surface of the bar and such that the assembly comprising the upright(s), the crossmember(s) and the insulating supports housing the bars, forms a rigid assembly, wherein each insulating support comprises a structural member having a substantially U shaped cross section, said structural member comprising a base configured to receive the corresponding bar positioned flat, and two flanks extending substantially at right angles to said bar, wherein flanks comprise fixing means, wherein one of the flanks comprises a clip while the other of the flanks comprises a runner, and wherein at least four of the insulating supports comprise, on one of their flanks, both a clip and a runner, said clip and runner extending in a direction substantially at right angles to one another, and wherein said four supports are fixed to one another so as to form a cross.

* * * * *